United States Patent [19] [11] 3,797,777
Hosono et al. [45] Mar. 19, 1974

[54] TAPE REEL AND TAPE REEL STORING MAGAZINE

[75] Inventors: Hiroo Hosono; Seiko Minamide, both of Osaka; Juichi Hukushima; Yoku Kudou, both of Neyagawa; Shunichiro Kimura, Osaka, all of Japan

[73] Assignee: Matsushita Electric Industrial Co., Ltd., Osaka, Japan

[22] Filed: Apr. 5, 1971

[21] Appl. No.: 131,351

[30] Foreign Application Priority Data

| | | |
|---|---|---|
| Apr. 8, 1970 | Japan | 45/30294 |
| Apr. 8, 1970 | Japan | 45/30295 |
| Apr. 8, 1970 | Japan | 45/34189 |
| Apr. 8, 1970 | Japan | 45/34191 |
| Aug. 24, 1970 | Japan | 45/84518 |
| Aug. 24, 1970 | Japan | 45/84519 |
| Aug. 24, 1970 | Japan | 45/84521 |
| Aug. 24, 1970 | Japan | 45/84523 |
| Sept. 18, 1970 | Japan | 45/93362 |
| Oct. 19, 1970 | Japan | 45/104352 |
| Nov. 30, 1970 | Japan | 45/120034 |
| Nov. 30, 1970 | Japan | 45/120036 |
| Nov. 30, 1970 | Japan | 45/120054 |
| Dec. 2, 1970 | Japan | 45/120723 |
| Dec. 2, 1970 | Japan | 45/120724 |

[52] U.S. Cl. .................. 242/197, 206/53, 242/71.8, 242/195

[51] Int. Cl. ...................... G11b 23/10, B65h 75/28

[58] Field of Search ........... 242/197, 198, 195, 210, 242/192, 71.8, 54.1, 74.2, 74.1, 74; 206/53

[56] References Cited

UNITED STATES PATENTS

| | | | |
|---|---|---|---|
| 2,614,761 | 10/1952 | Camras | 242/54.1 |
| 3,006,650 | 10/1961 | Ellmore | 242/71.8 X |
| 3,104,848 | 9/1963 | Joffe | 242/71.8 |
| 3,254,856 | 6/1966 | Camras | 242/71.8 X |
| 3,323,746 | 6/1967 | Mouissie | 242/74.2 |
| 3,379,387 | 4/1968 | Takahashi et al. | 242/195 |
| 3,502,283 | 3/1970 | Gross | 206/53 X |
| 2,105,238 | 1/1938 | Wittel | 242/74 |
| 3,006,650 | 10/1961 | Ellmore | 242/197 UX |
| 3,030,231 | 4/1962 | Bar | 242/74 X |
| 3,150,840 | 9/1964 | Briskin et al. | 242/195 |
| 3,558,077 | 1/1971 | Heinen | 242/192 |

*Primary Examiner*—George F. Mautz
*Attorney, Agent, or Firm*—E. Manning Giles

[57] ABSTRACT

A tape reel or a tape reel storing magazine of the type in which a leader tape can automatically thread along a predetermined path defined on a recording and reproducing apparatus, said tape reel having a plurality of circumferentially spaced resilient pieces which are provided by a plurality of radial cutouts formed on the outer periphery thereof, said resilient pieces serving to hold the leader tape on the outer peripheral portion of the reel in such a manner that the leader tape can easily be taken out of the reel when the tape is to be unwound.

9 Claims, 20 Drawing Figures

H. HOSONO,
S. MINAMIDE,
J. HUKUSHIMA,
Y. KUDOU AND
S. KIMURA
INVENTORS

BY Stevens, Davis, Miller & Mosher
ATTORNEYS

TAPE REEL AND TAPE REEL STORING MAGAZINE

The present invention relates to a reel for storing a recording or reproducing tape or a magazine for storing such a reel, and more particularly to a tape reel or a magazine for storing the tape reel of the type in which a leader type can automatically thread along a predetermined path defined in recording and reproducing apparatus.

The present invention has an object to provide a tape reel which holds the leading end of a tape on the outer peripheral portion thereof and the rotation of which exerts a force on the tape such that its leading end threads along a predetermined path.

Another object of the present invention is to provide a tape reel in which the leading end of a tape is free from excessive force and/or damage when it is disengaged from the reel so as to be fed through a predetermined passage or it is rewound and stored on the peripheral portion of the reel, and further the leading end of the tape is securely held by the tape reel so as not to be imprudently disengaged from the holding member of the reel.

A further object of the present invention is to provide a tape magazine which surely disengages the leading end of a tape stored therein and leads it outside of the magazine.

Still further object of the present invention is to provide a tape magazine having a reel which engages only with the leading end of a tape supported thereon and surely holds it on the outer peripheral portion of the reel without exerting any excessive force on the portions other than the leading end of the tape when the tape is rewound and stored on the reel.

In order to atain the above objects, a tape reel according to the present invention comprises a hub, an upper flange and a lower flange respectively on the opposite ends of the hub and a radially extending holding member made of a resilient material on at least one of the flanges, which member engages with a leader tape connected to the leading end of a tape wound around the hub and brings about the effects corresponding to the above-mentioned objects of the present invention.

Furthermore, a tape storing and supplying magazine in accordance with the present invention includes a reversibly rotatable reel for taking up a recording tape. Further, the magazine has a casing which has an opening for passing a tape from and into the reel. The reel is further provided with means for holding the outermost turn of the tape in such a manner that the outermost turn of the tape can readily be unwound and that the rolled tape is prevented from contacting with the wall of the casing. The magazine is further provided with disengaging means for disengaging the leading end portion of the rolled tape from said holding means to direct it toward said opening, and a press member for directing the tape which is being taken up toward a predetermined storing position.

The above and other objects and features of the invention will become apparent from the following descriptions taking reference to the accompanying drawings, and the appended claims. In the drawings:

Figure 1:
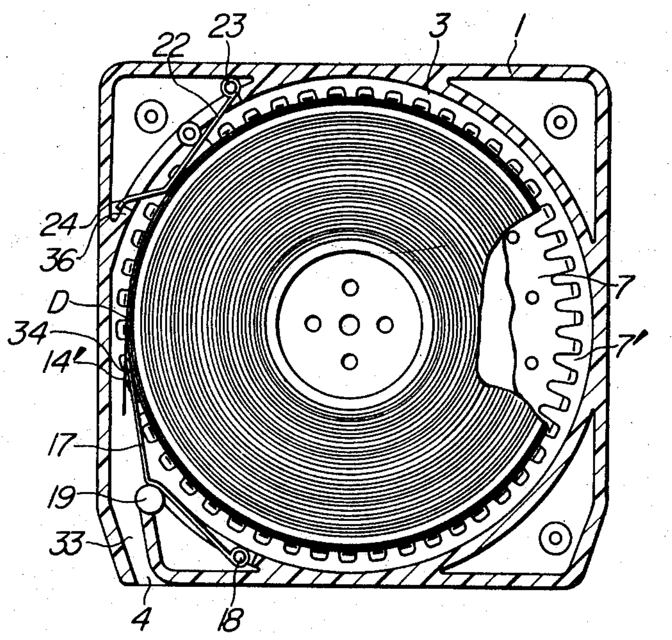
FIG. 1 is a sectional plan view of a tape magazine showing an embodiment of the present invention, a part of a rolled tape being broken away in order to show the detail of a reel.
Figure 2:
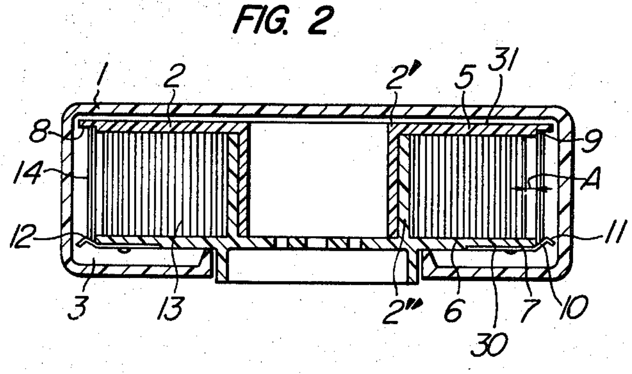
FIG. 2 is a sectional side view of the magazine shown in FIG. 1.
Figure 8:
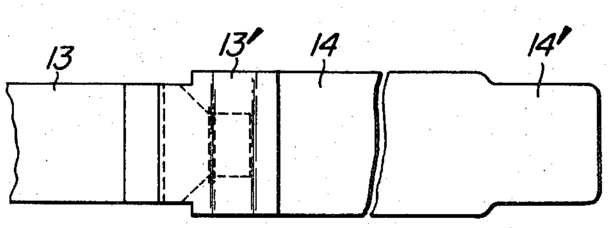
FIGS. 8 and 9 are plan and side views respectively showing the connection between the end of a recording medium taken up on the reel of the magazine and a leader tape.
Figure 9:
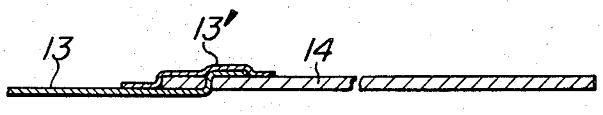

Referring now to the drawings, particularly to FIGS. 1 and 2, a magazine casing shown by the reference numeral 1 has a substantially cylindrical space 3 for receiving a tape reel 2. The casing 1 is provided at one of its sides with an opening 4 for passing a tape from and into the casing. As shown in FIG. 2, the tape reel 2 comprises a first member having a cylindrical hub 2′ and an upper flange 5, and a second member having a cylindrical hub 2′′ and a lower flange 6, the first and second members being fixed together. The flange 6 is provided at its peripheral portion with a leader tape holder 7 made of a resilient material such as metallic or organic material. The flange 5 is on the other hand provided at the outer peripheral portion with an annular recess or step 8 concentric with the axis of the hub 2′ and confronting with the leader tape holder 7. The recess 8 is so formed that a shoulder portion 9 formed thereby has a diameter substantially equal to that of the flange 6 having the holder 7. The holder 7 extends radially outwardly beyond the outer periphery of the flange 6 and is formed at its outer periphery with a plurality of circumferentially spaced cutouts 7′. Thus, the holder 7 comprises an annular base portion 30 for attachment with the flange 6, and a plurality of resilient pieces 12 each including an inclined portion 10 extending from the annular portion 30 radially outwardly and axially inwardly and a second inclined portion 11 extending from the portion 10 radially outwardly and axially outwardly. The holder 7 and the recess 8 cooperate to form holding means for a leader tape. A ribbon of recording medium such as a magnetic tape wound on the tape reel 2 and generally shown by the reference numeral 13 has a leader tape 14 connected to the leading end thereof through a connecting tape 13′ as shown in FIG. 8. The leader tape 14 has a width greater that that of the tape 13 and is made of a material having a rigidity enough to thread through a predetermined passage defined in a recording and reproducing apparatus. The length of the leader tape 14 is determined in accordance with the length of tape path defined in the recording and reproducing apparatus in which the magazine is used. The inner surface of the thicker portion 31 of the flange 5 is spaced from the inner surface of the flange 6 by a distance greater than the width of the magnetic tape 13 but smaller than the width of the leader tape 14. Further, the maximum distance between said recess 8 and the potion 10 of the holder 7 is substantially the same as the width of the leader tape 14. The distance between the recess 8 and the projecting edge of the resilient piece 12 is smaller than the width of the leader tape 14. Thus, the leader tape 14 is wound around the shoulder portion 9 and the outer periphery of the flange 6 and resiliently held along its width between the recess 8 and the portion 10 of the resilient piece 12 or held between the recess 8 and the portion 10 in such a manner that the disengagement of the outermost turn of the leader tape is prevented by the abutment of the portion 10.

The magnetic tape 13 can be taken up on or withdrawn from the tape reel 2 without contacting with the holder 7. In the position taken up on the reel 2, the magnetic tape 13 is spaced from the leader tape 14 as shown by A in FIG. 2, the spacing can be determined as desired.

Figure 3:
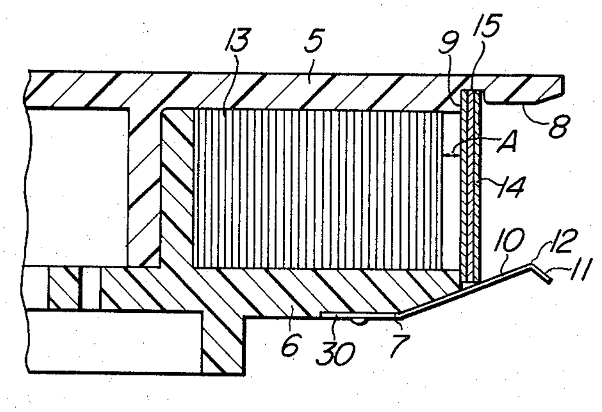
FIGS. 3 through 6 show several embodiments of the reel to be housed in the magazine.
Figure 4:
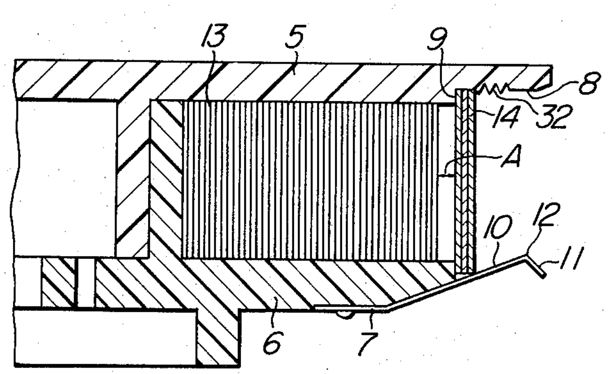
Figure 5:
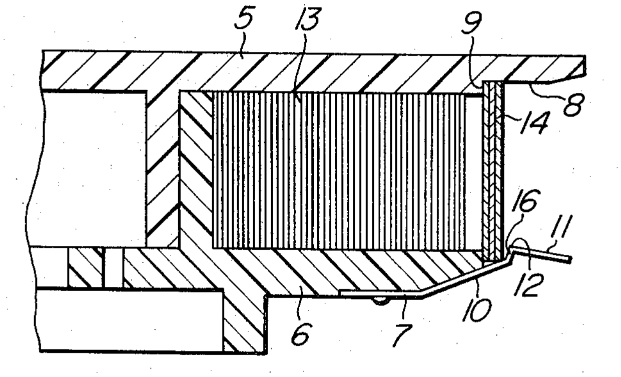

Further, in order to ensure that the leader tape 14 is securely held on the outer periphery of the reel, the flange 5 may be provided at the recess portion 8 with an annular groove 15 which is coaxial with the hub 2′ and in which the side edge of the leader tape 14 is received refer to FIG. 3. Alternatively, the recessed portion 8 may be formed with a plurality of indentations 32 so that the frictions between the recessed portion 8 and the side edge of the leader tap may be increased (refer to FIG. 4). Further, as shown in FIG. 5, in order to more securely hold the leader tape 14 each resilient piece 12 of the holder 7 may have an intermediate bent portion 16 between the portions 10 and 11 such that the leader tape 14 is caught in the space between the outer peripheral portion of the flange 6 and the intermediate bent portion 16.

As an another alternative, the recessed portion 8 on the flange 5 may be omitted and, instead of the portion 8, the flange 5 may be provided with a holder similar to and cooperating with the holder 7 on the flange 6 so as to securely hold the leader tape 14. In this case, the leader tape 14 is wound around the outer peripheries of the flanges 5 and 6.

Figure 6:
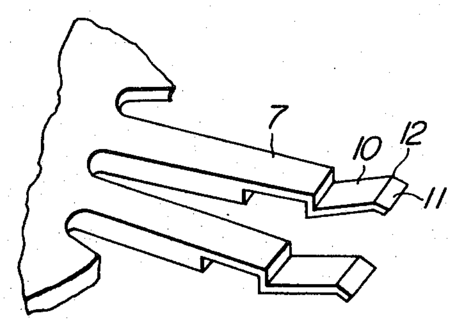
Figure 7:
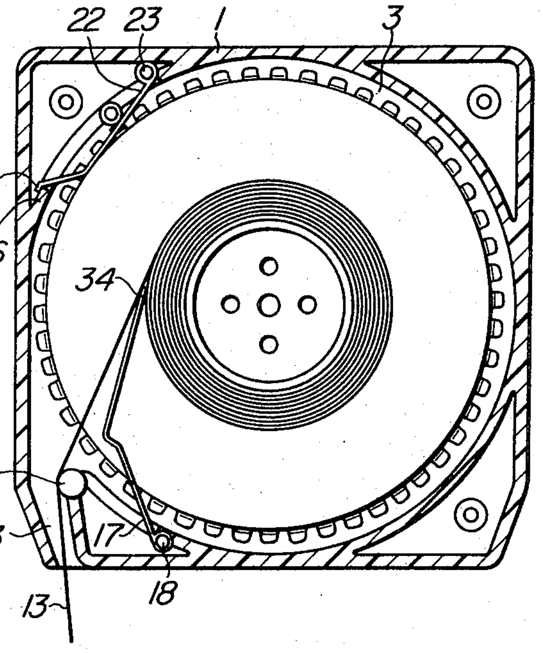
FIG. 7 is a sectional plan view of the magazine for showing the operation thereof.

In the illustrated embodiment, the leader tape holder 7 is made separately from the flange 6, however, as shown in FIG. 6 they may of course be formed integrally with the flange without sacrificing the function thereof.

Figure 16:
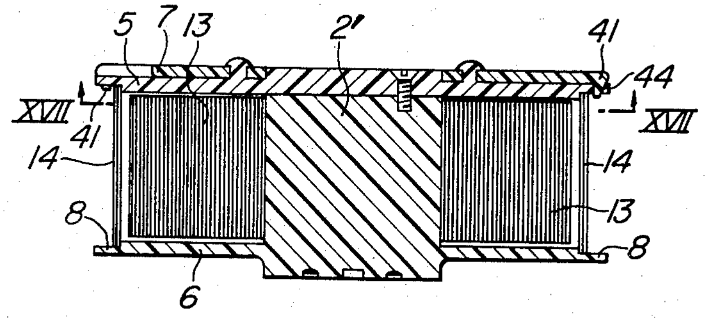
FIG. 16 is a sectional side view of another embodiment of the reel taken along line XVI — XVI.
Figure 17:
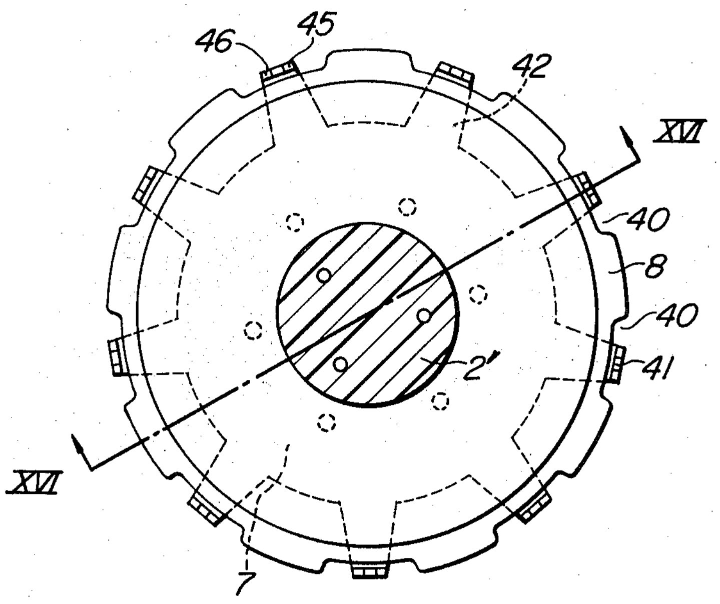
FIG. 17 is a sectional view of FIG. 16 taken along line XVII — XVII.
Figure 18:
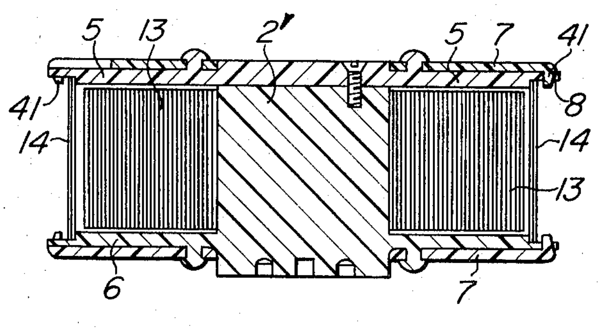
FIG. 18 is a sectional side view of further embodiment of the reel.

Other embodiments of the tape reel according to the present invention are shown in FIGS. 16 to 20. As shown in FIGS. 16 and 17, an upper flange 5 of a tape reel is provided on its outer peripheral portion with an annular recess 8 having a plurality of circumferentially spaced and radially extending cutouts 40. A leader tape holder or holding member 7 having a plurality of circumferentially spaced and radially outwardly extending holding pieces 42 is fixedly mounted on the upper flange 5. Each of the holding pieces 42 is easy to bend along its thickness and has a projection 41 on its end. The holding member 7 is concentric with the flange 5 and each projection 41 is disposed in each of the cutouts 40 and projects through the cutout 40 past the plane including the surface of the recess 8. The holding pieces 42 serve as means for resiliently holding the leader tape 14, as in the case of the previously described embodiments. A lower flange 6 opposed to the flange 5 which mounts the holding member 7 may be formed with a recess on its outer peripheral portion alike the above-mentioned embodiments. However, as shown in FIG. 18, in order to more securely hold the leader tape 14, both flanges 5, 6 may respectively be provided with the holding member 7.

Figure 19:
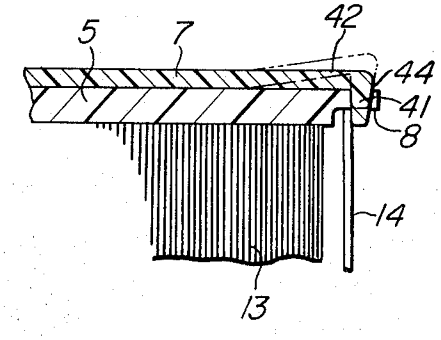
FIG. 19 is an enlarged sectional side view showing the essential part of FIGS. 16 and 18.
Figure 20:
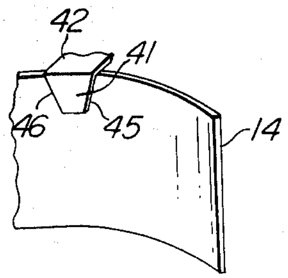
FIG. 20 is a diagrammatic perspective view of the holding piece in FIGS. 16 and 18, showing the leader tape which is being disengaged.

As shown in FIG. 19, the projection 41 extends downwardly from the holding piece 42 with its outer surface 44 inclined towards the center of the reel such that the leader tape 14 is easily passed through the projection 41 and placed in a predetermined position when it is taken-up. Further, as shown in FIG. 20, a side edge 45 of the projection 41 which serves as a leading edge when the tape reel is rotated in the unwinding direction is inclined inwards such that the projections are tapered towards their end extremity. This arrangement prevents the side edge of the leader tape from being damaged when it is disengaged from the holding means on the reel.

In the case where both flanges are respectively provided with the holding members 7 as shown in FIG. 18, the inclination of the side edges 45 of both projection 41 are opposite to each other. Therefore, if the projection 41 is previously formed with another inclined side edge 46 similar to the edge 45 on the opposite side thereof, the flange having such a projection may be used as either of the upper and the lower flanges, and this is suitable for the mass production of the holding members.

In the aforementioned embodiments, the holding member 7 may of course be formed integrally with the flange without reducing the function thereof.

Furthermore, in the previously described embodiments when both flanges are respectively provided with the holding members 7, or when one of the flanges is formed with an annular groove 15 in which a side edge of the leader tape 14 is received, it is not always necessary to resiliently hold the leader tape along its width. This is because the outermost turn of the leader tape wound on the tape reel abuts against the projection of the holding member 7 or the projecting edge of the resilient members 12 or the side of the annular groove 15, and this prevents the outermost turn of the leader tape from being disengaged from the holding means.

All the tape reels appearing in the foregoing description are housed in a magazine when used. If, however, a recording and reproducing apparatus comprising the tape reels is provided with the disengaging means and the press means which will be described later, these tape reels can dispense with the magazine.

In the embodiment of the present invention shown in FIGS. 1 and 2, a disengaging member or leaf spring member 17 is provided in the magazine in such a manner that it contacts at one end with the outer surface of the leader tape 14 taken up on the reel 2 and at the other end is pivotally supported by a pivot shaft 18 on the magazine casing 1. The magazine casing 1 is provided with a guide pin 19 adjacent to a guide passage 33 leading to the opening 4. Thus, when the tape is fully taken up on the reel 2, the disengaging member 17 is forced to engage with the pin 19 whereby the member 17 is resiliently deflected so as to press at its free end 34 the leader tape taken up on the reel 2. As will be apparent from the drawings, the guide pin 19 also serves to prevent the tape from contacting with the passage wall in the magazine casing when the tape is passed into an out of the casing. Upon rotating the reel 2 in the counterclockwise direction, the free end 34 of the disengaging member 17 serves to disengage the leading end 14′ of the leader tape 14 from the holder 7 and direct it toward the opening 4 of the magazine casing 1.

Figure 10:
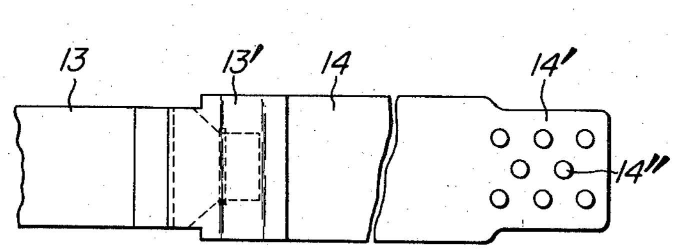
FIGS. 10 and 11 are plan and side views respectively of a modification of the connection shown in FIGS. 8 and 9.
Figure 11:
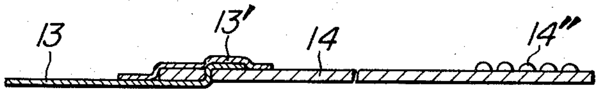

As described above, the leader tape 14 is suitable spaced from the magnetic tape 13 when they are taken up on the reel, as shown by A in FIG. 2, so that when the leader tape 14 is completely fed out of the magazine casing 1 the disengaging member 17 is allowed to move out of contact with the pin 19 toward the center of the reel. Thus, the tape subsequently fed out of the magazine will not be subjected to damages or effect of any adverse force. A similar function will be obtained by applying a force to the disengaging member 17 so that it may be forced to pivot toward the center of the reel. As shown in FIG. 8, by making the leading end 14′ of the leader tape 14 narrower than the remaining portion thereof, the leading end 14′ does not contact with the holder 7 and the recessed portion 8 so that the rigidity of the leader tape 14 serves to keep the leading end thereof away from the contact with the tape wound on the reel (refer to FIG. 1). Thus, the disengaging action by the member 17 can be enhanced. Further, as shown in FIGS. 10 and 11, the leading end portion 14′ of the leader tape may be provided at its inner surface with a plurality of projections 14″ whereby the leading end portion 14′ can have an increased tendency of moving apart from the tape wound on the reel.

Figure 12:
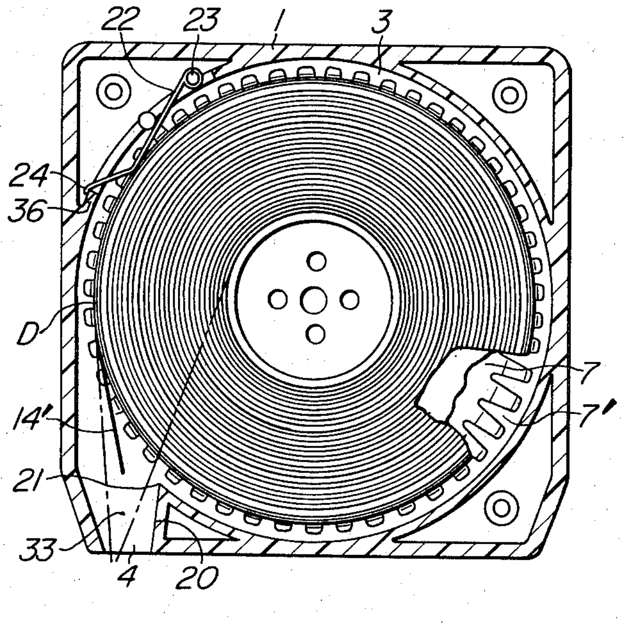
FIG. 12 is a sectional plan view of a tape magazine showing another embodiment of the present invention, a part of a rolled tape being broken away in order to show the detail of a reel.

Although it is possible to substantially prevent the magnetic tape from being damaged by using the aforementioned disengaging member, the disengaging member 17 unavoidably contacts to some extent with the magnetic tape 13. In order to completely avoid any contact between the tape being moved into and out of the magazine and other members or parts of the magazine, the arrangement as shown in FIG. 12 may be employed. In the arrangement of FIG. 12, the narrow end portion 14′ of the leader tape 14 has a substantial length, so that an increased length of the leader tape is maintained free from contact with the reel. Further, the disengaging member 17 is omitted in this embodiment but, instead of it, there is provided a triangular projection 21 having a wall 20 defining a passage 33 in the magazine. Thus, when the reel 2 is rotated in the unwinding direction, the leading end 14′ of the leader tape 14 is guided by the wall 20 along the passage 33, and the remaining portion of the leader tape 14 is unwound from the holder 7 to be fed out of the magazine casing 1.

Figure 13:
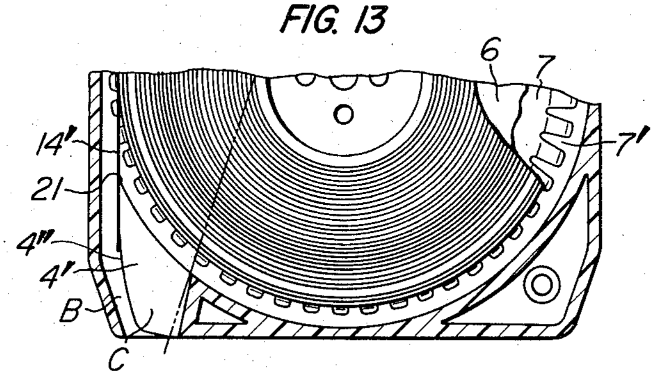
FIG. 13 is a sectional plan view of a part of a tape magazine showing further embodiment of the present invention, a part of a rolled tape being broken away in order to show the detail of a reel.
Figure 14:
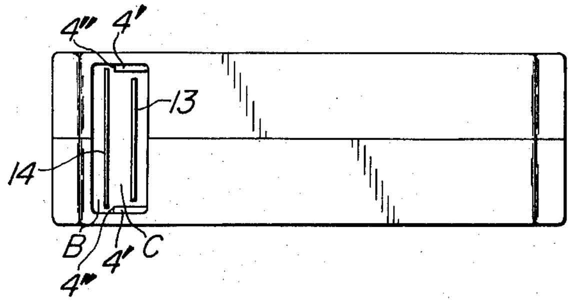
FIG. 14 is a sectional side view of the magazine shown in FIG. 13.

In the above arrangement, in order that the magnetic tape 13 does not contact with the magazine casing 1 in any diameter of the wound tape, the opening 4 of the magazine casing 1 must have an increased width so that the leading end 14′ of the leader tape being fed out of the casing 1 through the opening 4 thereof cannot always assume a predetermined position. In order that the leading end of the leader tape can be fed out of the magazine strictly through a predetermined position, walls 4′ may be formed in the guide passage 33 leading to the opening 4 of the magazine casing 1 so as to provide a first portion B of the passage 33 which is wider than the width of the leader tape 14 and a second portion C of the passage 33 which is narrower than the leader tape 14 but wider than the magnetic tape 13. (refer to FIGS. 13 and 14) With this arrangement, the leading end 14′ of the leader tape 14 is unwound from the reel 2 by engaging with the end surfaces 4″ of the walls 4′ and fed out of the magazine casing through said first portion B of the passage 33. Thus, the leader tape 14 is forced to pass the relatively narrow portion B of the passage 33 and its position can be relatively accurately controlled.

In the drawings, the reference numeral 22 shows a resilient press member for pressing the leader tape 14 into the space between the holder 7 on the flange 6 and the recess 8 on the flange 5 when the leader tape 14 is taken into the magazine casing through the opening 4. The resilient press member 22 may preferably be provided for its original purpose at the point D where the leader tape 14 begins to contact with the reel 2, however, from a practical point of view, there may be some problems. When the reel is rotated in the unwinding direction to feed the leader tape 14 out of the magazine casing, the friction between the resilient member 22 and the leader tape 14 produces a force tending around the point of contact therebetween to disengage the leader tape 14 from the holder 7. Further, when the leader tape is being fed out of the casing, any load subjected to the leader tape from the recording and reproducing apparatus is transmitted to the portion of the leader tape which is still in the magazine. These forces may serve, when combined, to disengage the leader tape 14 from the holder 7 on the reel 2 and thereby there is a fear of the leader tape wound on the reel in the magazine being in a relaxed state. In order to avoid this disadvantageous effect, it may be a way to reduce the force of the resilient press member 22, however, this manner of solving the problem will diminish the depressing effect of the resilient member 22. In order to eliminate the above disadvantages, the location and arrangement of the resilient member 22 must be precisely controlled. As far as the location is concerned, it is preferred to locate the member 22 at a position opposite to the opening 4 with respect to the point where the leader tape 14 comes into or out of contact with the reel 2 when the leader tape 14 is moved into or out of the magazine casing.

With this arrangement, any drag force acting on the leader tape 14 can be absorbed by the holder 7 before it is transmitted to the portion where the member 22 is provided. Therefore, said drag force is not combined with a force produced by the friction between the leader tape 14 and the member 22. Futher, as far as the arrangement is concerned, the resilient member 22 is pivotally mounted at one end on the magazine casing 1 by means of a pin 23, the other end being left free and provided with a bent portion 24. The free end of the resilient member 22 extends from the pivoted end in the unwinding direction of the reel 2. The resilient press member 22 is adapted to engage with the leader tape 14 to apply a pressing force thereon. The bent portion 24 is so arranged that it engages with a projection 36 provided on the magazine casing 1, whereby the stroke of the deflection of the member 22 is limited within a predetermined amount. Thus, the contact between the member 22 and the magnetic tape taken up between the flanges 5 and 6 can be avoided. With this arrangement of the resilient member 22, the friction between the member 22 and the leader tape 14 can be reduced when the reel is rotated in the unwinding direction, since the bent portion 24 of the member 22 can be disengaged from the projection 36. Therefore, in this arrangement, frictional loss can remarkably be reduced.

On the other hand, when the reel 2 is rotated in the taking up direction, the resilient member 22 serves to press the leader tape 14 taken in the magazine casing 1 into the space between the flanges 5 and 6 to be held by the holder 7. Thus, the leader tape 14 can be brought into the predetermined position against the cooperating action of the recess 8 of the flange 5 and the holder 7 of the flange 6.

Figure 15:
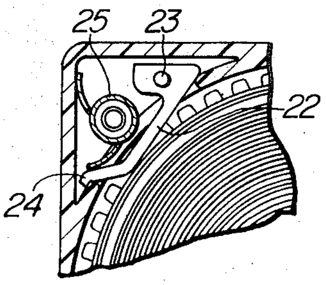
FIG. 15 is a sectional plan view of a part of a tape magazine showing still further embodiment of the present invention.

FIG. 15 shows a modification of the member 22, in which the resiliency of the member 22 itself is no more utilized but a separate spring member 25 is provided to force the member 22 toward the reel 2.

From the above descriptions, it will become apparent that the arrangement of the present invention provides a tape reel which engages with and securely holds the outermost turn of the tape would thereon such that the outermost turn of the tape is not disengaged imprudently from the holding means of the reel, and a tape magazine in which a tape can be readily passed into and out of the magazine casing. Further, the magazine of the present invention is easy to assemble and adjust, so that it is particularly suitable in an apparatus such as a video tape recorder which has a complicated guide passage for the tape leader and in which a smooth tape movement is required during recording and reproducing.

The present invention has thus been described with reference to several preferred embodiments illustrated in the drawings, however, it should be noted that the invention is not intended to be limited to the detail of the illustrated embodiments but several modifications and changes may be made without departing from the scope of the invention as defined by the appended claims.

We claim:

1. In a tape reel and magazine combination of the type in which said reel comprises a hub with two axially spaced flanges thereon between which a continuous length of ribbon-like recording medium is adapted to be wound and unwound on said hub, the respective flanges having peripheral portions around which a leader strip attached to and of greater width than said recording medium is adapted to be wound and unwound, and in which said magazine comprises a casing with support means therein for rotatably holding said reel and an aperture through which the recording medium and lead strip are adapted to pass when being wound or unwound with respect to said reel, the improvement where at least one of said flanges is provided with a plurality of radially outwardly extending resilient fingers engageable with an edge of said leader strip, and said tape magazine is provided with yieldable press means adjacent and biased toward said reel for pressing said leader strip into engagement with said resilient fingers and said magazine is also provided with intercepting means for disengaging said leader strip from said resilient fingers.

2. The tape reel and magazine combination in accordance with claim 1 wherein the intercepting means comprises an elongated leaf spring, said casing being provided with an internal pivot to which one end of said spring is engaged and with a projection adjacent said aperture against which said spring is adapted to retract, said spring having a free end extending beyond said projection for contact with the outer convolution of said leader strip when wound on said reel, said spring being held in resilient tangential contact with said convolution when retracted against said projection.

3. The tape reel and magazine combination in accordance with claim 1 in which the leader strip has a leading end which is narrower in width than the remaining portion, whereby said leading end is left free of engagement with the resilient fingers so as to permit said leading edge to project somewhat tangentially from the reel so as to be engageable by said intercepting means when the tape reel is unwound.

4. The tape reel and magazine combination in accordance with claim 3 wherein the intercepting means comprises an integral wall portion of said casing projecting toward the center thereof and defining a guide passage leading to said aperture whereby, when the recording medium is unwound, the free end of the leader strip engages said wall portion and is guided thereby through said aperture out of the magazine.

5. The tape reel and magazine combination in accordance with claim 1 wherein a stop means is provided in said casing adjacent and spaced from said press means in the direction of the bias of said means and engageable thereby to prevent said means from exerting pressure against the recording medium when the leader strip is not wound on the peripheral portions of the tape reel flanges.

6. The tape reel and magazine combination in accordance with claim 1 in which the leading end of the leader strip is provided with a plurality of protuberances adapted to space said leading end outwardly from the next inwardly convolution of said strip against which said leading end is wound.

7. The tape reel and magazine combination in accordance with claim 4 wherein said casing includes a plurality of confronting wall portions defining a guide passage leading from the reel to the aperture, a first portion of said passage having a width greater than that of the leader strip and a second portion of said guide passage having a width greater than the recording medium but less than the leader strip and wherein the intercepting means comprises one of the width defining confronting wall portions.

8. The tape reel and magazine combination in accordance with claim 1 in which said press means is disposed adjacent said aperture and is adapted by reason of its bias to exert pressure on the leader strip toward the center of the reel at a position opposite to the aperture in the magazine at the point where the leader strip comes into engagement with said reel, whereby the leader strip can be retained against displacement on the peripheral portions of the reel flanges.

9. The tape reel and magazine combination in accordance with claim 5 in which said press means is of a rigid material, and a spring member is provided for biasing said press means toward said tape reel.

* * * * *